United States Patent [19]
Garrett

[11] Patent Number: 6,018,809
[45] Date of Patent: Jan. 25, 2000

[54] APPARATUS AND METHOD FOR CAPTURING INFORMATION OFF A PLURALITY OF BI-DIRECTIONAL COMMUNICATION BUSES

[76] Inventor: Brian Garrett, 35 Fruit St., Hopkinton, Mass. 01748

[21] Appl. No.: 08/829,559

[22] Filed: Mar. 28, 1997

[51] Int. Cl.[7] ................................................. G06F 11/25
[52] U.S. Cl. ................................................. 714/37; 714/45
[58] Field of Search ........................ 395/183.21, 183.13, 395/183.14, 183.15, 185.04, 182.04, 500, 568, 569; 714/45, 37, 38, 39, 51; 712/227, 228

[56] References Cited

U.S. PATENT DOCUMENTS

| | | | |
|---|---|---|---|
| 4,924,466 | 5/1990 | Gregor et al. | 371/12 |
| 5,056,013 | 10/1991 | Yamamoto | 364/200 |
| 5,155,845 | 10/1992 | Beal et al. | 395/182.04 |
| 5,165,036 | 11/1992 | Miyata et al. | 395/800 |
| 5,233,618 | 8/1993 | Glider et al. | 395/182.04 |
| 5,321,828 | 6/1994 | Phillips et al. | 395/500 |
| 5,347,649 | 9/1994 | Alderson | 395/183.21 |
| 5,513,338 | 4/1996 | Alexander et al. | 395/500 |
| 5,560,036 | 9/1996 | Yoshida | 395/800 |
| 5,642,478 | 6/1997 | Chen et al. | 395/183.21 |
| 5,754,827 | 5/1998 | Barbier et al. | 395/500 |
| 5,781,778 | 7/1998 | Meier et al. | 395/183.21 |

OTHER PUBLICATIONS

Stunkel et al., "Address Tracing for Parallel Machines", Computer, vol. 24, Iss. 1, pp. 31–38, Jan. 1991.

Stunkel et al., "Collecting Address Traces from Parallel Computers", Proceedings of the 24th annual Hawaii Int'l Conf. on System Sciences, IEEE, pp. 373–383, 1991.

*Primary Examiner*—Robert W. Beausoliel, Jr.
*Assistant Examiner*—Scott T. Baderman
*Attorney, Agent, or Firm*—John M. Gunther, Esq.; Leanne J. Fitzgerald, Esq.

[57] ABSTRACT

An apparatus for capturing data transmitted over of a plurality of bidirectional communication buses is provided. The apparatus comprises a plurality of trace engines, each trace engine having a trace analyzer and a central processing unit connected together with a bus. Each one of the trace engines is connected to another trace engine, so that all of the trace analyzers within the trace engines are synchronized to a common clock. The synchronization to a single common clock allows all of the data captured by the plurality of trace engines to be analyzed or used together.

8 Claims, 5 Drawing Sheets

APPARATUS AND METHOD FOR CAPTURING INFORMATION OFF A PLURALITY OF BI-DIRECTIONAL COMMUNICATION BUSES

FIELD OF THE INVENTION

This invention relates generally to trace analyzers used with a small computer system interface bus, and more particularly to an apparatus and method for capturing data from a plurality of small computer system interface buses.

BACKGROUND OF THE INVENTION

The small computer system interface (SCSI) is a specification (ANSI std. X3.131-1986) for a peripheral bus and command set. The SCSI interface defines a high performance, peripheral interface that distributes data among peripherals independently of a host computer. SCSI may include an multi-port bus that can accommodate either single or multiple host systems. The use of a multi-port bus generally permits multiple devices, such as disk drives to be coupled to a single SCSI bus. As an example, eight disk drives can be coupled to an eight-port SCSI bus. With the advent of different types of SCSI buses, such as wide and ultra-wide SCSI, even more devices may be coupled to a SCSI bus.

The SCSI bus has a plurality of conductors which utilize a plurality of signals, some of which are used for control and some of which are used for data. The data lines are bidirectional and transfer data, commands, status and message information. The control signals and bus phases used in accordance with the conductors determine when and in what direction the data is transferred.

EMC Corporation, assignee of the present invention, manufactures and sells the Symmetrix® family of Integrated Cached Disk Array (ICDA®) storage subsystems. Some models of the Symmetrix family of ICDA storage subsystems can have, for example, one-hundred and twenty-eight (128) different disk drives in a single storage subsystem. Since a SCSI bus is capable of handling multiple peripherals on a single bus, it is a useful way of connecting a host computer or host computers to the ICDA storage subsystem.

In an ICDA storage system connected to a host computer or computers, large amounts of information are regularly being transferred between the host computer(s) and the ICDA storage system. It is often desirable understand different aspects of the information being transferred between the host computer and the ICDA. For example, the host computer may issue a write command to the ICDA. The entire process of the write operation resulting from the write command is commonly called an I/O (input/output) operation). The I/O will include the write command from the host computer, the data to actually be written to the ICDA, and a status update indicating that the write to the ICDA was successful. In the I/O just described, if the host computer is considered the initiator and the ICDA is considered the target, and the I/O is analyzed from the perspective of the host computer, the following sequence would hold. The write command would be considered a "message out," The data to be written to the ICDA would also be considered a "message out," and the status update returned to the host computer by the ICDA would be considered a "message in." Thus during the I/O the direction of the I/O changes once.

It should also be understood that the I/O occurs for a certain duration. If the beginning of the write command occurs at $T_1$, and the completion of the status occurs at $T_2$, the length of the I/O is $T_1$–$T_2$.

In situations such as those explained, it is desirable to know for example, how many times the direction of the I/O changes, and when such changes occur. It is also useful to know how may of the commands are write commands versus read commands. Lastly, it is also useful to know the length of the I/Os. When this type of information is known it can be used for a variety of purposes, such as performance, modeling and benchmarking analysis, which will indicate how the performance of the ICDA. This type of information is obtained by capturing the information off of the SCSI bus.

Typically, prior art trace analyzers or engines are capable of capturing the data off of only one SCSI bus. For a variety of reasons, a single SCSI analyzer is not useful for capturing data off a plurality of SCSI buses. The amounts of data which have to be captured off a plurality of SCSI buses may be to much for a single device. For example, in what is known in the art as a "deep trace," data is captured for some predetermined time such as hours, days, weeks or months. Additionally, the connection between the host computer and the ICDA may have a number of SCSI buses. Therefore, in order to capture data for the system as a whole, a number of SCSI analyzers would be required.

Using a number of discrete SCSI analyzers may be able to capture the data, but the data may be not be useful. If, for example, the wish is to find out many write commands occurred a predetermined time period, use of different discrete SCSI analyzers may not be able to provide such information. Each SCSI analyzer would be capturing data off of a single SCSI bus according to its own clock, but if it is desired to look at performance of the ICDA as a unit during the predetermined time, there is not any way to ensure that all of the clocks on the different SCSI analyzers are in sync with one another. If the data collected is not collected by analyzers on a common clock, then when the data is analyzed, it will not be an accurate reflection of what occurred during the predetermined time period. Thus if one wants to know the how may write commands, over a multi-bus SCSI, took place during the predetermined time period, the different SCSI analyzers will not have a common clock. Therefore, the data collected by the different SCSI analyzers may not show how may write commands actually took place during the predetermined time period. The data collected by the different SCSI analyzers then cannot be analyzed together, as there is not any time consistency among the data. Any analysis that uses the data, such as modeling, benchmarking or performance would not be accurate. It would be useful therefore, to have a device capable of capturing data off a plurality of SCSI buses in a format which will allow all of the data captured off of the plurality of SCSI buses to be analyzed together.

SUMMARY OF THE INVENTION

In accordance with the present invention, an apparatus and a method for capturing data off a plurality of bidirectional communication buses is provided. The apparatus comprises a plurality of trace engines for capturing the data off of the plurality of bi-directional buses. Each one of the trace engines has a trace analyzer and a central processing unit (CPU) connected to the trace analyzer. Each trace analyzer sits passively on one bi-directional communication bus, and contains a clock. The trace analyzer captures data off of the bidirectional bus it is connected to, where it can be read by the CPU. Each one of the trace engines is connected to other trace engines through a communication means which ensures data captured by all of the trace engines is synchronized to a common clock.

In accordance with another aspect of the present invention, the communication means comprises a plurality of pins on each of the trace engines. Each set of the plurality of pins is connected to a jumper. A single communication cable is connected to all of the jumpers. The communication cable is capable of receiving a signal which is originated by one of the clocks on one of the trace engines. The signal is then sent through one set of the plurality of pins and the communication cable transmits the received signal to the clocks contained on the other trace engines to obtain synchronization of all the clocks on all of the trace engines.

In accordance with another aspect of the present invention a method for capturing data off of a plurality of bi-directional communication buses is provided. The method includes the following steps. The data is captured off of the plurality of bidirectional communication buses by using a plurality of trace engines which are connected together. Each one of the trace engines includes a time stamp and a clock. When the data is captured off of the plurality of bidirectional communication buses it is time stamped wherein the time stamping is done with the clock that has been synchronized with all of the other clocks contained in all of the other trace engines. Once the data is time stamped it is stored in a designated storage area, until it is read by a CPU connected to the trace engine.

In accordance with another aspect of the present invention, each of the plurality of trace engines is connected to a network port, allowing all of the data captured by the plurality of trace engines to be communicated to a network. Once the data is contained within a network it can be transmitted to a first remote device, and if desired to a second remote device.

BRIEF DESCRIPTION OF THE DRAWINGS

The above and further advantages of the present invention may be better understood by referring to the following description taken into conjunction with the accompanying drawings in which.

DETAILED DESCRIPTION OF PREFERRED EMBODIMENT

Figure 1:
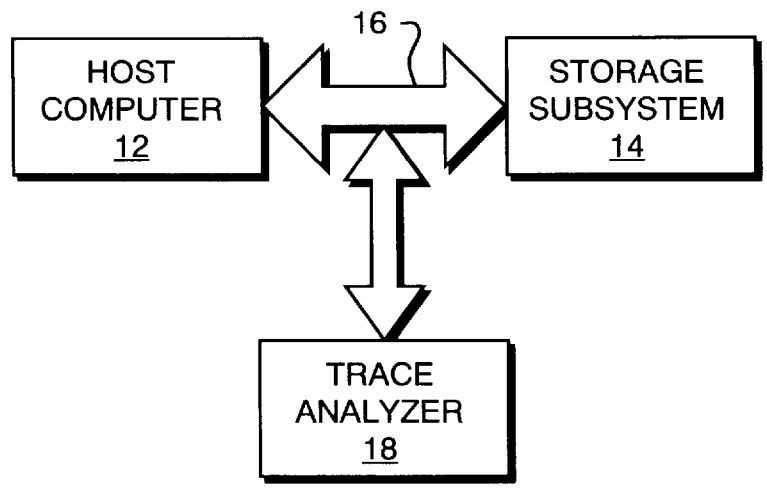
FIG. 1 is a block diagram representation of a prior art arrangement use of a trace analyzer.

Referring to FIG. 1, a typical prior art SCSI analyzer arrangement 10 is shown. In this arrangement 10, a host computer, 12 is connected to storage subsystem 14 via a SCSI bus 16. A SCSI trace analyzer 18, as is well known in the art, sits passively on the SCSI bus 16. In this arrangement the trace analyzer 18 is only capable of collecting data off of the one SCSI bus 18. In order to collect data off of more than one SCSI bus, a trace analyzer would have to be positioned with each and every SCSI bus, and would have the earlier explained problems.

Figure 2:
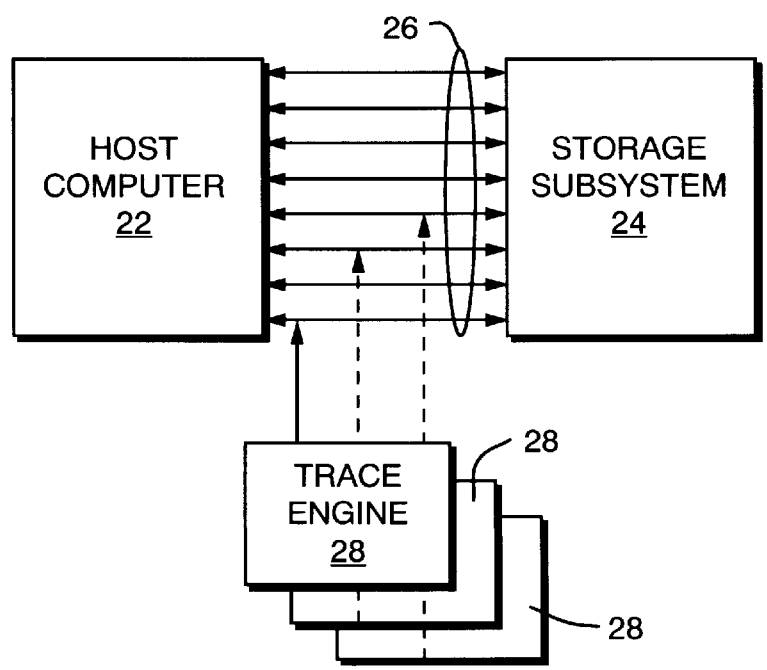
FIG. 2 is a block diagram representation of the arrangement for use of a trace analyzer as used in the present invention.

Turning to FIG. 2, a portion 20 of the SCSI analyzer arrangement of the present invention is shown. In the arrangement 20 a host computer 22 is connected to a storage system 24 via a plurality of SCSI buses 26. As is known, each SCSI bus contained a plurality of wires. A plurality of trace engines 28 sits passively on each of the SCSI buses 26 as is well known in the art. A typical trace analyzer will utilize a fifty or sixty pin connector to connect to each SCSI bus. It should be understood that other bi-directional communication buses could also be encompassed within the present invention.

Figure 3:
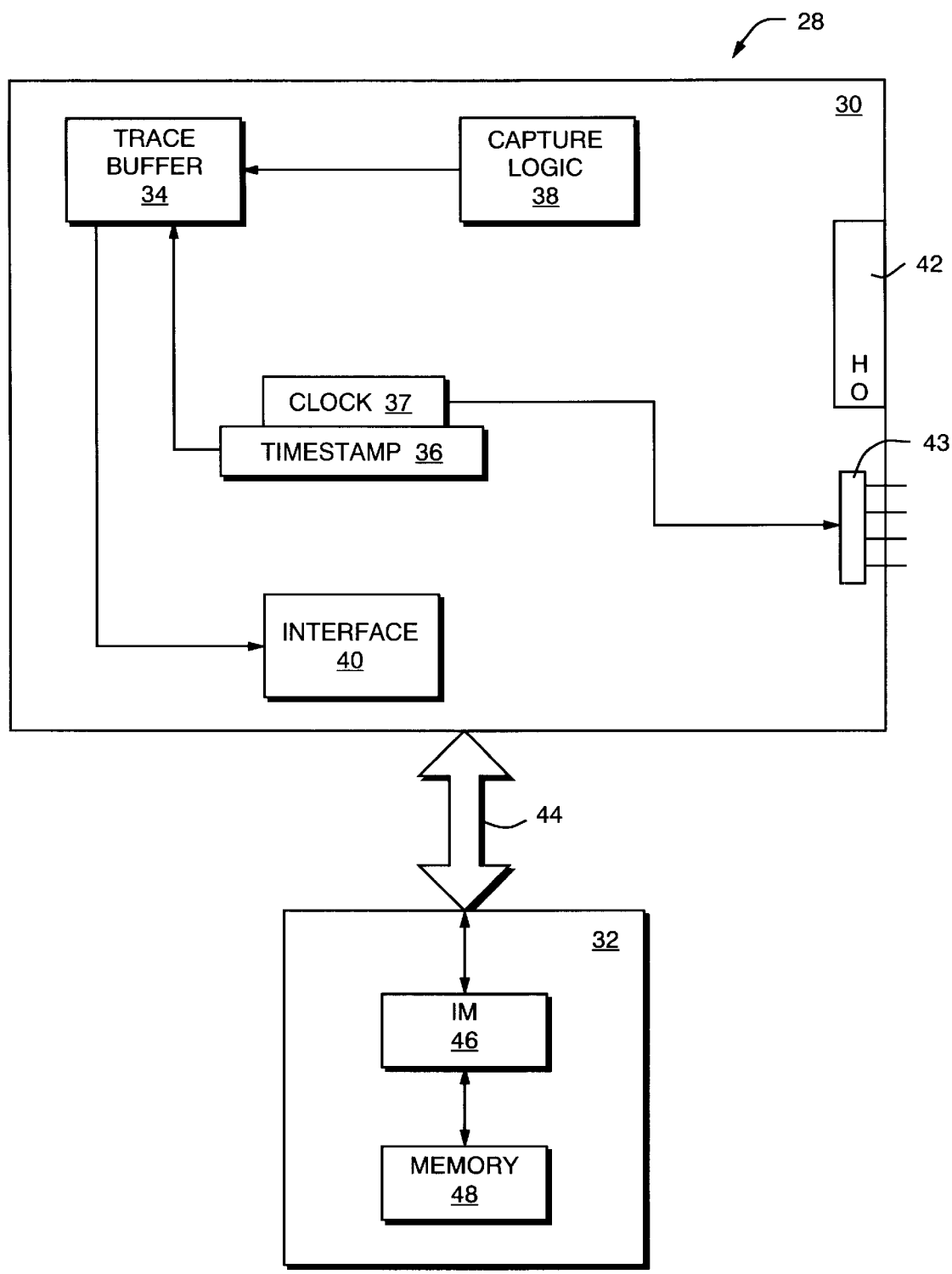
FIG. 3 is block diagram representation further illustrating the layout of the trace analyzer and a central processing unit (CPU) according to the present invention.

FIG. 3 illustrates a more detailed explanation of the trace engine 28. A trace analyzer 30 is shown connected to a central processing unit (CPU) 32. The trace analyzer 30 contains a trace buffer 34, a time stamp 36, a clock 37, capture logic 38, an interface 40 for communication with the CPU 32, and a bus interface 42, for communication with the SCSI bus, as earlier explained. The trace analyzer 28 also has an interface 43 which communicates with a set of pins 64 and clock 37, as will be explained in conjunction wit FIG. 5. As indicated, the trace analyzer 30 sits passively on one of the SCSI buses. The data being transferred bilaterally by the SCSI bus between the host computer and the storage system is captured off of the SCSI bus by the capture logic 38. Captured data is transferred to the trace buffer 34, where it is time stamped with the time stamp 36. Trace analyzer 30 is a commercially available trace analyzer such as the IPC-6500 available from I-TECH Corporation of Edina, Minnesota. It should be understood that other commercially available trace analyzers could also be used.

In the preferred embodiment of the invention the CPU 32 is a commonly available 386 personal computer board, and has interrupt handler hardware 46 and memory 48. It is understood that other personal computer boards could be used with the present invention. Both the CPU 32 and the trace analyzer 30 are connected to an Industry Standard Architecture (ISA) bus 44, which facilitates communication between the two elements. The trace analyzer 30, continuously captures and places data into the trace buffer 34. When the trace buffer 34 begins to reach its capacity, the trace buffer 34, which may be a dual port random access memory (RAM), sends out an interrupt signal. The interrupt signal (not shown) is sent from the trace buffer 34 to the ISA bus 44. The interrupt signal sent out will raise a specific line of the ISA bus 44. The interrupt handler 46 will recognize the raising of the specific line on the ISA bus 44, termed an interrupt. The interrupt handler 46 then "wakes up." The interrupt handler 46 recognizes that the specific line or signal has been raised and begins to interrogate the interrupt by checking a register (not shown) in the hardware contained on the trace analyzer 30. The register is checked to ascertain what interrupt(s) have happened. The interrupt handler 46 needs to perform the interrogation, as the interrupt could signal different types of problems, such as an error or a crash message.

The interrogation allows the interrupt handler 46 to determine, for example, that this interrupt is particular to the trace buffer 34. Upon recognizing that the interrupt is for the trace buffer 34, the CPU 32 begins to read the data contained in the trace buffer 34 through the interface 40. It should be understood that the CPU 32 needs to know where to begin reading the data from and where to stop reading the data. In the preferred embodiment of the invention two (2) pointers (not shown) are provided for the data contained in the trace buffer 34. The pointers could simply be flags or any other item which can indicate to the CPU 32 particular addresses or locations within the trace buffer 34.

The first pointer indicates the location in the trace buffer 34 where the data was being written to at the time of the interrupt signal occurring on the ISA bus. The second pointer indicates the location where the CPU 24 stopped reading the data, during the CPU 32 last read of the trace buffer 34. The CPU 32 will read the data in the trace buffer 34 beginning with the second pointer and will read all of the data stored in the trace buffer 34 until the first pointer. Thus, the CPU 32 reads the data written into the trace buffer 34 since it last read the data. Thus the CPU 32 reads the data which has been entered into the trace buffer 34, since the previous interrupt signal. Data will continue to be written to the trace buffer 34, while the CPU 32 is reading data, but this newly written data will not be read by the CPU 24 until the subsequent read operation. This permits data to continue to be read by the trace analyzer 30 into trace buffer 34, even while trace buffer 34 is being read by the CPU 32.

The CPU 24 reads the data from the trace buffer 34, and places it into the memory 48. In the preferred embodiment of the invention the memory 48 is a random access memory (RAM), although other types of memories could be used. Once the data is in the memory 48, it can then be written elsewhere. Typically, the interrupt handler 46 triggers the memory 48 to write the data contained in the memory 48 to a directly connected storage device, such as a disk drive (not shown), as is known in the art.

Figure 4:
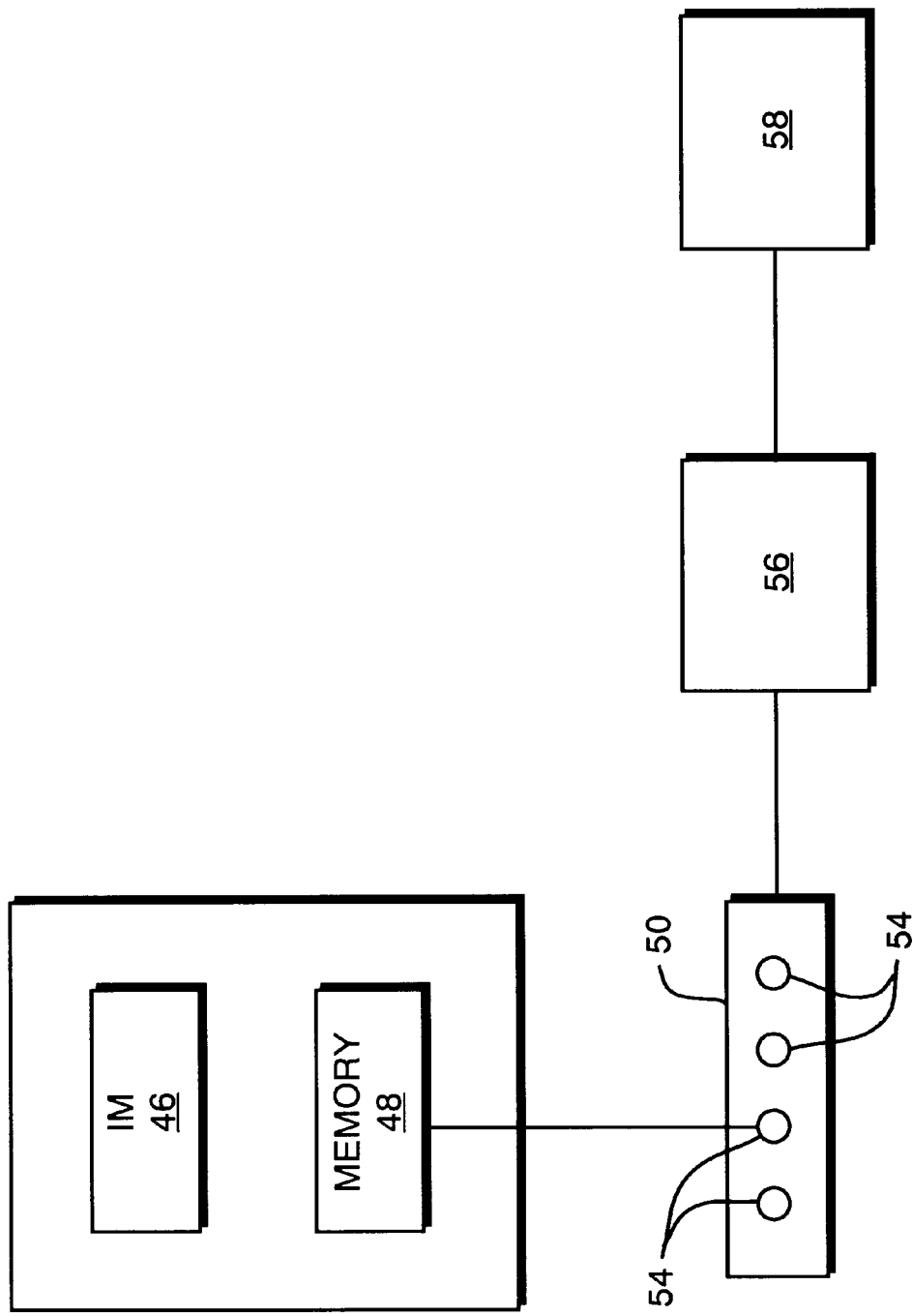
FIG. 4 is a block diagram representation of the connection between the CPU and a network according to the present invention.

Turning to FIG. 4, in the present invention, the data is preferably written from the memory 48 to an ethernet port 50, connected to the CPU 32. The interrupt handler 46 triggers the memory 48, so the CPU 32 can write the data from the memory 48 directly to the ethernet port 50. The use of the ethernet port 50 allows the CPU 32 to be part of a network (not shown), such as an ethernet local area network (LAN). The ethernet port 50 contains a plurality of nodes 54, which allow other trace engines (identical to trace engine 28 shown in FIG. 2) to be connected to the network through their respective CPUs 32. Therefore, the data is written from the CPU 32 to the network.

Each of the nodes 54 on the network are connected to other CPUs identical to CPU 32, in FIG. 2. Also connected to the ethernet port 50 is a computer 56. Computer 56, which can be a personal computer gathers all of the data from all of the nodes 54, and can be located remotely from the trace engines. The computer 56 is then gathering the desired data from multiple SCSI buses. Since the computer 56 is gathering the data from the plurality of SCSI buses, all of the data gathered is available to the computer 56 for interleaving and analysis. The computer 56 may also be connected to a storage device 58, to store the data captured by the trace engines.

In the preferred embodiment of the invention, eight (8) separate multi-port SCSI trace engines are connected to the ethernet port 50 (only one connection is shown in FIG. 4). It should also be recognized that eight (8) separate multi-port SCSI trace engines could also be connected to a single disk drive. One of the advantage of the present invention is that the computer 56 can be located remotely from one or more of the multi-port SCSI trace engines. The computer 56 can then be placed in a location that is most advantageous for performing the analysis. Once the data is collected by the computer 56, it can then be written down and stored on the storage device 58. Once stored, the data can, if desired, be compressed, scrutinized and analyzed.

One of the problems with the prior art was that if all the data were collected from a plurality of trace analyzers, there was not a way of ensuring that the data collected from different devices was consistent or of the same generation. For example, if it is desired to do a deep trace of for example, two weeks to determine the length of the I/Os during that time, and the data is being collected by a plurality of different trace analyzers, each of the trace analyzers must be on the same time frame or reference. The time reference needs to be the same since time over which the information is collected needs to be accurate. The present invention solves this problem by means of the connection shown in FIG. 5.

Figure 5:
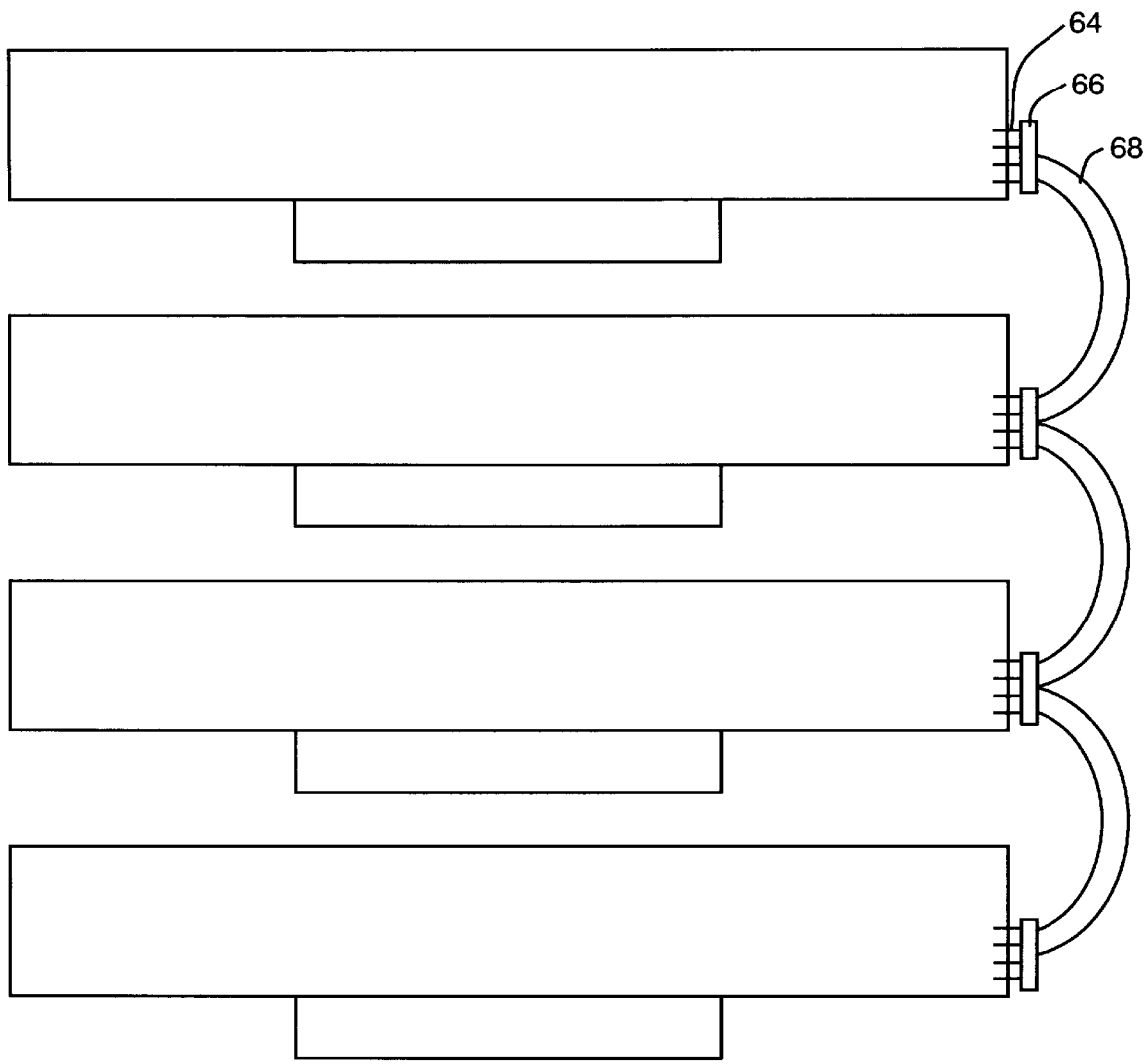
FIG. 5 is a representation of the connection between a plurality of trace engines according to the present invention.

Turning to FIG. 5, the connection 60 between the plurality of multi-port SCSI trace engines 26 is shown. Each of the trace analyzers 26 includes the set of pins 64. The set of pins 64 is connected to a jumper 66. Each of the jumpers 66 is connected to a single ribbon cable 68. The cable 68 is preferably a flat ribbon cable containing a plurality of wires to receive signals and data from the set of pins 64. Note, all of the data collected into the trace buffer 34 (FIG. 2) is time stamped by the time stamp 36, which has the clock 37. The clocks 37 contained in each of the time stamps 36 are synchronized to act as a common clock, so that the data collected from each of the plurality of multi-port trace engines 26 is synchronized to the one common clock. Since each of the trace analyzers 28 have their own clock 37, the trace analyzers 28 are capable of being programmed so the clock can be reset as desired. For example, if the clock 37 keeps trace of the data in a year-month-day-hours-minutes-seconds-milliseconds-nanoseconds (Y/M/D/H/M/S/MS/NS) format, the trace analyzer can reset the least significant counters (S/MS/NS) to zero. If one of the trace analyzers resets its clock 37, then all of the clocks in each of the trace analyzers are reset in parallel. This can be done because of the connection of FIG. 5. Referring again to FIG. 2, a signal can be sent by the CPU 32 through the interface 43 through the set of pins 64 over the wires contained in the cable 68 to reach the clock 37 of the other connected trace analyzers. The signal, for the other trace analyzers 28 is received by the set of pins 64 and transmitted to the clock 37 which will be reset according to predetermined counters, as indicated above. Therefore, all the clocks in all of the trace analyzers are synchronized.

Figure 6:
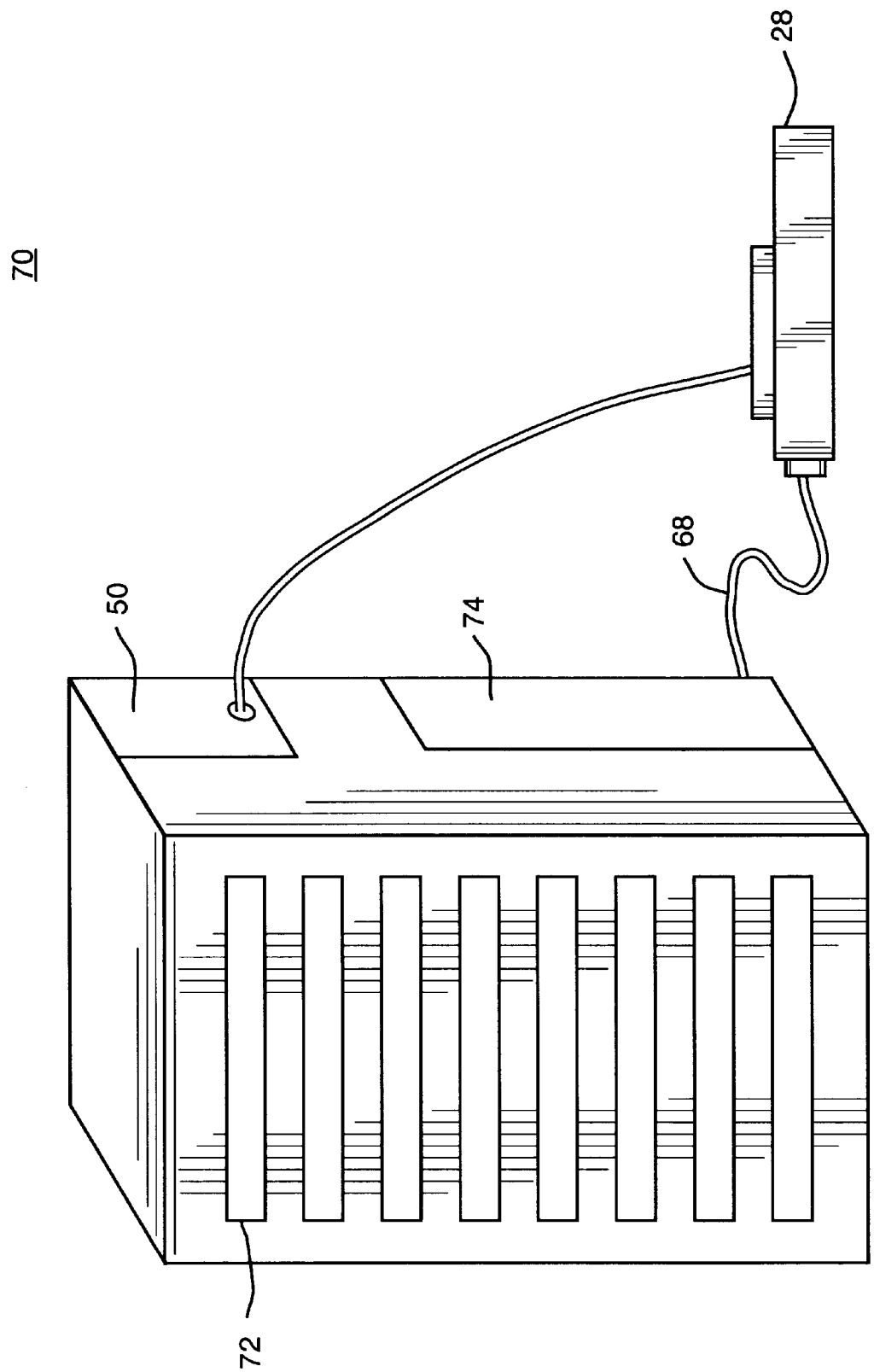
FIG. 6 is a representation of an arrangement for the plurality of the trace engines of FIG. 5.

Looking to FIG. 6, another embodiment of the present invention is shown. In this embodiment, a tower 70 having eight (8) slots 72 is shown. The tower 70 includes the ethernet port 50, and also has a power supply 74. Any number of the slots 72 can contain the trace engine of FIGS. 2–3, with the connections described in FIG. 5. A trace engine 28 can also be remote from the tower 70, so long as it can be in contact with the ethernet port 50 and the cable 68.

Having described a preferred embodiment of the present invention, it will now become apparent to those of skill in the art that other embodiments incorporating its concepts may be provided. It is felt that this invention should not be limited to the disclosed embodiment, but rather should be limited only by the spirit and scope of the appended claims.

What is claimed is:

1. An apparatus for capturing data from a plurality of bi-directional communication buses in a computer system, comprising:

a plurality of trace engines for capturing data off of said plurality of bi-directional communication buses, each of said plurality of trace engines comprising:
a trace analyzer residing passively on one of said plurality of bi-directional communication buses, for capturing data off of said bi-directional communication bus;
a central processing unit (CPU) external to and connected to said trace analyzer for reading the captured data from said trace analyzer; and communication means connecting one said trace engine to another of said trace engines, for ensuring said data captured by said plurality of trace engines is synchronized to a clock on one of said plurality of trace engines, wherein each said trace engine has its own clock and said communication means comprises:
- a plurality of pins, on each of said plurality of trace engines, in communication with said clock on said each of said plurality of trace engines,
- a jumper attached to each of said plurality of pins: and
- a communication cable connected to each said jumper, wherein said communication cable receives a signal, through one of said plurality of pins, from said clock on one of said plurality of trace engines, and transmits said signal to said clocks on said plurality of trace engines.

2. The apparatus of claim 1, said trace analyzer further comprising:
- capture logic for capturing data off of said bidirectional communication bus;
- a trace buffer for receiving said data from said capture logic, and for storing said data;
- a time stamp in communication with said clock, for time stamping said data as it is received by said trace buffer; and
- an interface in communication with said CPU, for receiving data from said trace buffer and for sending said data to said CPU.

3. The apparatus of claim 2, further comprising:
- a bus in communication with said interface, and said CPU for transmitting said data from said interface to said CPU.

4. The apparatus of claim 3, said CPU further comprising:
- an interrupt handler for recognizing and determining when said trace buffer reaches its storage capacity, wherein said interrupt handler recognizes a signal on said bus, send by said trace buffer, and interrogates said trace buffer to determine if said trace buffer has reached its storage capacity; and
- a memory, storing data received from said trace buffer.

5. The apparatus of claim 4, further comprising:
- a network port in communication with said memory, for communicating said data from said memory to a second device, wherein said network port has a plurality of connections for receiving connections from a plurality of memories on a plurality of trace engines.

6. The apparatus of claim 1, wherein said bidirectional bus is a small computer systems interface bus.

7. The apparatus of claim 5, wherein said network port is an ethernet port.

8. The apparatus of claim 3, wherein said bus is an Industry Standard Architecture bus.

* * * * *

UNITED STATES PATENT AND TRADEMARK OFFICE
CERTIFICATE OF CORRECTION

PATENT NO. : 6,018,809
DATED : January 25, 2000
INVENTOR(S) : Brian Garrett

It is certified that error appears in the above-identified patent and that said Letters Patent is hereby corrected as shown below:

Title page, add:

Assignee: EMC Corporation, Hopkinton, Massachusetts, USA

Signed and Sealed this

Twenty-eighth Day of August, 2001

Attest:

*Nicholas P. Godici*

NICHOLAS P. GODICI
*Acting Director of the United States Patent and Trademark Office*

*Attesting Officer*